Oct. 29, 1968  K. M. GEBEL  3,407,543
PRECISION SIZE CONTROL BY A POSITIVE STOP
Filed Sept. 29, 1965
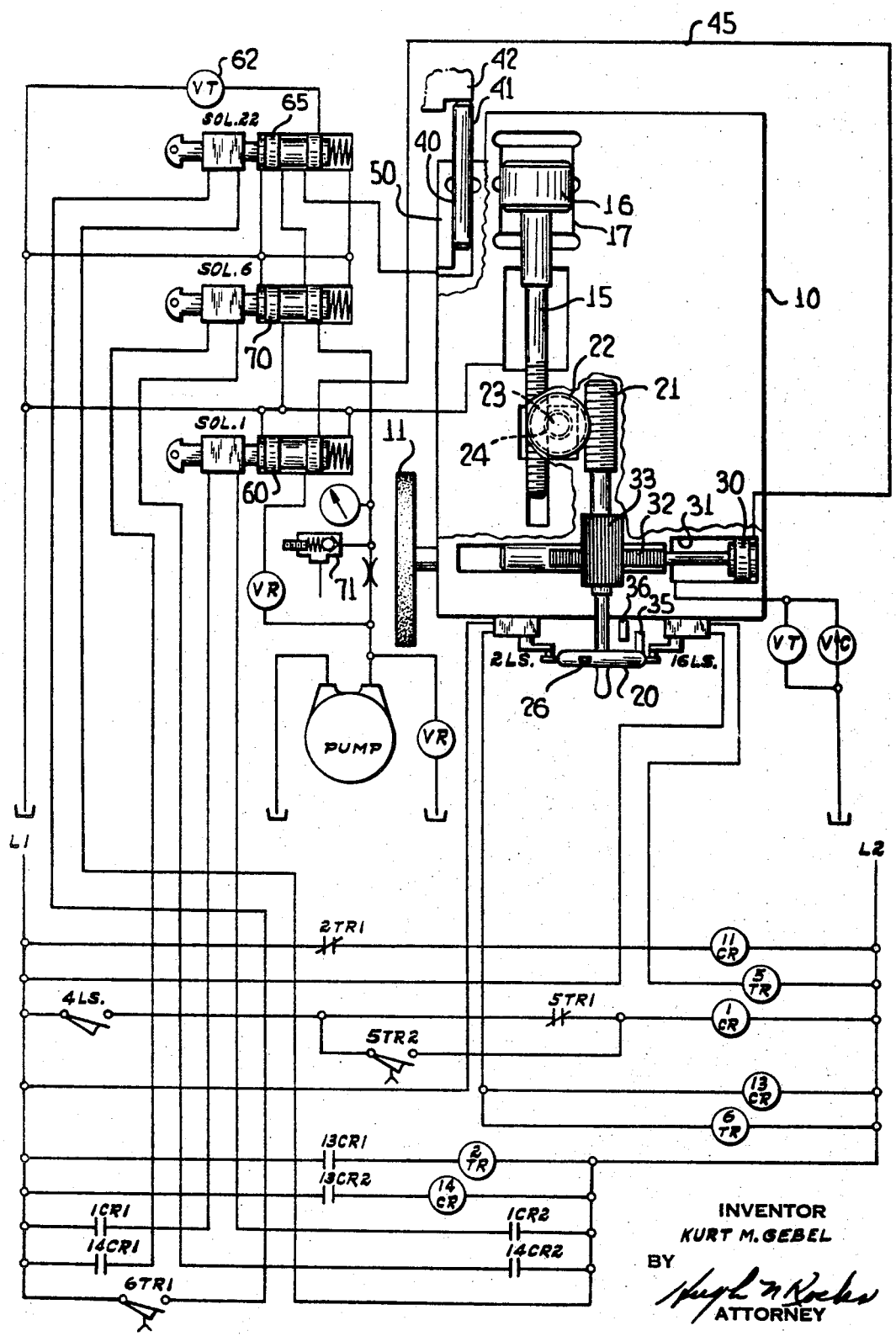
INVENTOR
KURT M. GEBEL
BY
ATTORNEY

United States Patent Office 3,407,543
Patented Oct. 29, 1968

3,407,543
PRECISION SIZE CONTROL BY A
POSITIVE STOP
Kurt M. Gebel, Waynesboro, Pa., assignor to Landis Tool
Company, Waynesboro, Pa.
Filed Sept. 29, 1965, Ser. No. 491,145
8 Claims. (Cl. 51—165)

ABSTRACT OF THE DISCLOSURE

The disclosure of this application relates to a machine tool having a feed mechanism for advancing and retracting a tool support for a machining operation. A piston and cylinder are mounted for movement relative to one another by movement of said tool support at a predetermined point in the advance of said tool support. A valve is actuated for directing fluid under pressure to said cylinder to stop the movement of said tool support. While the tool support is held against movement, the operation of the feed mechanism continues and imposes a strain in the elements of said feed mechanism. A second valve connects said cylinder alternately with said first mentioned valve and an exhaust line having a restriction, so that while said cylinder is connected to said exhaust line, the strain in the feed mechanism will be released to further advance the tool support at a rate determined by said restriction to complete the grinding operation.

---

The present invention relates to feed mechanisms for machine tools, particularly mechanisms in which final size is determined by a positive stop rather than by a gauge.

This invention relates more particularly to a feed mechanism in which a force is applied to all or part of the mechanism while the tool support or other member is held against movement.

Apparatus of this type is disclosed in U.S. Patent 3,183,631, granted May 18, 1965, and in co-pending application, U.S. Ser. No. 409,439, filed Nov. 6, 1964, now abandoned. In both of these devices, the means for releasing strain in the feed mechanism is actuated manually at the discretion of the operator and with the assistance of a visual indicator to show the extent of movement of the slide.

It is, therefore, an object of the present invention to provide means operable automatically to stop the advance of the slide or other device before the completion of the machining operation and to continue to apply power to the feed mechanism while said slide or other device is held against movement, and after a predetermined interval, to automatically provide a controlled release of the strain in said feed mechanism to effect a further advance of the slide or other device to complete the machining operation.

The drawing is a hydraulic and electric circuit.

In the drawing, wheel support 10 has a grinding wheel 11 rotatably mounted thereon.

The means for advancing and retracting wheel support 10 for a grinding operation consists of a feed screw 15 actuated axially by rapid feed piston 16 in cylinder 17.

The means for adjusting the zone of operation of the feed mechanism and for advancing and retracting wheel support 10 for a grinding operation, consists of a hand wheel 20 operable through a worm gear 21 and worm wheel 22 to rotate vertical shaft 23. Shaft 23 has a worm wheel or pinion 24 in operative relation with the threads of feed screw 15. The hand wheel mechanism may be power-actuated by means of slow feed piston 30 in cylinder 31 and connected through rack 32 to pinion 33 on shaft 23 of hand wheel 20.

The means for preventing movement of wheel support 10 while the feed mechanism is placed under a strain, consists of cylinder 40 which may be either in bed 50 or wheel support 10. In this case, cylinder 40 is in bed 50. Retard piston 41 in cylinder 40 has one end extending from said cylinder into the path of abutment 42 on wheel support 10.

Operation

A grinding cycle is started by energizing infeed control relay 11CR through a circuit which includes normally closed timer relay contact 2TR1.

Control relay 11CR operates through control members (not shown) to direct fluid under pressure to the head end of rapid feed cylinder 17, advancing wheel support 10 to a position for starting the grinding operation.

The grinding operation is started when wheel support 10 actuates limit switch 4LS to complete a circuit through normally closed relay contact 5TR1 to energize relay 1CR.

Contacts 1CR1 and 1CR2 complete a circuit to energize solenoid 1 and shift valve 60 to the right, directing fluid under pressure through line 45 to the head end of slow feed cylinder 31, moving piston 30 to the left.

Slow feed piston 30 shifts rack 32 to rotate pinion 33, hand wheel 20, worm gear 21, worm wheel 22, vertical shaft 23 and pinion 24 to advance wheel support 10 relative to feed screw 15 for a grinding operation.

At a predetermined point of the grinding operation, limit switch 16LS is actuated by cam 26 on hand wheel 20. Limit switch 16LS completes a circuit to energize timer relay 5TR.

Normally closed contact 5TR1 opens to deenergize solenoid 1, shifting slow feed valve 60 to the left and stopping the slow feed movement. At this point, the work may be, for example, .003" oversize.

After a predetermined interval, contact 5TR2 times closed, energizing slow feed relay 1CR and solenoid 1, causing valve 60 to shift to the right so that fluid under pressure is again directed to slow feed cylinder 31 to resume the grinding feed.

While the work is still oversize a predetermined amount, for example, .001", feed completion limit switch 2LS is closed to energize relays 13CR and 6TR.

Contact 13CR1 closes to energize relay 2TR.

Contact 13CR2 closes to energize relay 14CR.

Contacts 14CR1 and 14CR2 close to energize retard solenoid 6, shifting retard valve 70 to the right and directing fluid through valve 65 to retard cylinder 40. This fluid is at a low pressure determined by relief valve 71 which is sufficient to stop the advance of grinding wheel 11.

Slow feed cylinder 31 is still under pressure and imposes a strain on the feed mechanism by continuing the advance of hand wheel 20 until stop 35 on hand wheel 20 engages the fixed stop 36, while wheel support 10 is held against movement by the pressure in retard cylinder 40.

After a predetermined interval to allow a sparkout operation as well as the continued movement of the feed mechanism for applying strain on said feed mechanism until stop 35 engages stop 36, relay 6TR times out and contact 6TR1 closes to energize solenoid 22, transferring retard cylinder 40 from the low pressure to a restricted exhaust through throttle valve 62.

The strain in the feed mechanism, thus released, resumes the advance of wheel support 10 at a rate determined by throttle valve 62 and for a time sufficient to complete the grinding operation to the desired size.

Relay 2TR energized by contact 13CR1 at the same time as relay 6TR is energized, is set for a longer interval than relay 6TR so that the feed movement of wheel support 10, effected by the release of strain in the feed mechanism, continues until relay 2TR times out.

Normally closed contact 2TR1 opens to deenergize infeed relay 11CR which operates through means (not shown) to retract wheel support 10 and stop the grinding operation.

I claim:

1. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a machining operation,
    (e) a piston and cylinder adapted to be moved relative to one another by movement of said tool support,
    (f) a supply of fluid under pressure,
    (g) a valve actuated at a predetermined point in the advance of said tool support for directing said fluid under pressure to said cylinder to stop the movement of said tool support, while the operation of said feed mechanism continues, and imposes a strain in said feed mechanism,
    (h) a second valve between said first mentioned valve and said cylinder and operable in one position to connect said first mentioned valve with said cylinder,
    (i) an exhaust line having a restriction,
    (j) and control means for actuating said second valve to connect said cylinder with said exhaust line.

2. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a machining operation,
    (e) a piston and cylinder adapted to be moved relative to one another by movement of said tool support,
    (f) a supply of fluid under pressure,
    (g) control means actuated when a workpiece is machined to a predetermined oversize to direct said fluid under pressure to said cylinder to stop the movement of said tool support while the operation of said feed mechanism continues to a position corresponding to final size, and imposes a strain in said feed mechanism,
    (h) an exhaust line having a restriction,
    (i) and another control means operable at a predetermined point in the machining operation to connect said cylinder to said exhaust line.

3. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a grinding operation,
    (e) a piston and cylinder adapted to be moved relative to one another by movement of said tool support,
    (f) a supply of fluid under pressure,
    (g) a positive stop for determining the finish size of a workpiece,
    (h) means operable before said positive stop is reached to direct said fluid under pressure to said cylinder to stop the movement of said tool support while continuing the operation of said feed mechanism to said positive stop, whereby to impose a strain in said feed mechanism,
    (i) an exhaust line having a restriction,
    (j) and means to connect said cylinder with said exhaust line for controlling the movement of said tool support in response to the release of said strain in said feed mechanism.

4. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a grinding operation,
    (e) a piston and cylinder adapted to be moved relative to one another by movement of said tool support,
    (f) a supply of fluid under pressure,
    (g) control means actuated when a workpiece is machined to a predetermined oversize, for directing said fluid under pressure to said cylinder, to prevent further movement of said tool support, while continuing the operation of said feed mechanism, and thereby, imposing a strain in said feed mechanism,
    (h) an exhaust line having a restriction,
    (i) and another control means operable thereafter to connect said cylinder with said exhaust line.

5. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a grinding operation,
    (e) a piston and cylinder adapted to be moved relative to one another by movement of said tool support,
    (f) a supply of fluid under pressure,
    (g) a positive stop in said feed mechanism for determining the finish size of a workpiece,
    (h) means operable while a workpiece is still oversize to direct said fluid under pressure to said cylinder to stop the movement of said tool support while continuing the operation of said feed mechanism to said positive stop, whereby to impose a strain in said feed mechanism,
    (i) an exhaust line having a restriction,
    (j) and means to connect said cylinder with said exhaust line for controlling the movement of said tool support in response to the release of said strain in said feed mechanism.

6. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a grinding operation,
    (e) a piston and cylinder adapted to be moved relative to one another by movement of said tool support,
    (f) a supply of fluid under pressure,
    (g) control means actuated when a workpiece is machined to a predetermined oversize, for directing said fluid under pressure to said cylinder, to stop the movement of said tool support, while continuing the operation of said feed mechanism, and thereby imposing a strain in said feed mechanism,
    (h) an exhaust line having a restriction,
    (i) and automatic means operable after a predetermined interval to connect said cylinder with said exhaust line to release said fluid under pressure from said cylinder at a controlled rate.

7. In a feed control mechanism for a machine tool having
    (a) a bed,
    (b) a tool support slidably mounted on said bed,
    (c) a cutting tool mounted on said tool support,
    (d) a feed mechanism for advancing and retracting said tool support for a grinding operation,
    (e) a piston and cylinder adapted to be moved relative to one another by movement of said tool support,
    (f) a supply of fluid under pressure,
    (g) control means actuated when a workpiece is machined to a predetermined oversize, for directing said fluid under pressure to said cylinder, to stop the movement of said tool support, while continuing the operation of said feed mechanism, and thereby imposing a strain in said feed mechanism,
    (h) an exhaust line having a restriction, (i) and timing means actuated by said control means and operable after a first interval to connect said exhaust line to said cylinder to release the strain in said feed mechanism to provide a fine increment of feed, and after a longer interval, to stop the grinding operation.

8. In a feed control mechanism for a machine tool having
(a) a bed,
(b) a tool support slidably mounted on said bed,
(c) a cutting tool mounted on said tool support,
(d) a feed mechanism for advancing and retracting said tool support for a grinding operation,
(e) a piston and cylinder adapted to be moved relative to one another by movement of said tool support,
(f) a supply of fluid under pressure,
(g) control means actuated when a workpiece is machined to a predetermined oversize, for directing said fluid under pressure to said cylinder, to stop the movement of said tool support, while continuing the operation of said feed mechanism, and thereby imposing a strain in said feed mechanism,
(h) an exhaust line having a restriction,
(i) a pair of timers and means actuated by said feed mechanism to energize said timers, one of which times out to connect said cylinder and said exhaust line and permit a further feed movement in response to the release of strain in said feed mechanism, the other of which times out to stop the grinding operation.

References Cited
UNITED STATES PATENTS 3,183,631   5/1965   Price et al. _____ 51—165

LESTER M. SWINGLE, *Primary Examiner.*